Oct. 24, 1967

R. E. CANNON 3,348,658

SAMPLE CONVEYING CHAIN FOR LIQUID
SCINTILLATION SPECTROMETER
Filed April 11, 1966

INVENTOR.
RAYMOND E. CANNON

BY TE Kristofferson

ATTORNEY

United States Patent Office 3,348,658
Patented Oct. 24, 1967

3,348,658
SAMPLE CONVEYING CHAIN FOR LIQUID SCINTILLATION SPECTROMETER
Raymond E. Cannon, San Diego, Calif., assignor to Beckman Instruments, Inc., a corporation of California
Filed Apr. 11, 1966, Ser. No. 541,843
5 Claims. (Cl. 198—131)

ABSTRACT OF THE DISCLOSURE

A conveyor chain is provided having tubular links forming workpiece holding receptacles, with adjacent links positioned such that their circumferences substantially intersect along a vertical line. The vertical hole through adjacent links receives a pin to interconnect the links and provide for positive rotational orientation. Keyways are provided in the links for interacting with keys such as might be contained on a device to be contained in one of the links to orient the device.

---

This invention relates to a sample conveying chain construction for a liquid scintillation spectrometer and, more particularly, to such chain capable of being driven with a relatively low torque and maintaining its rotational orientation.

In the prior art, sample changers used simple rotary tables such as disclosed in U.S. Patent 2,924,718, Packard et al., to transport samples automatically, but the round configuration was an uneconomic use of the available space, limiting the sample capacity in a given amount of room. Since an almost universal shortage of laboratory floor space requires instruments that will do the most in the least amount of room, most of the present prior art conveyors have one thing in common; the sample conveyor layout is rectangular, thereby using the available space more efficiently. However, there are many different types of conveyor chains employed.

For example, a sample conveying chain consisting of three separate pieces per sample is disclosed in U.S. Patent 3,206,006, Meeder et al., in which the pieces are connected together to form a chain of the desired length and number of samples. The link is fabricated from a rigid metal, numbered from one to 100 or 200 or whatever the maximum capacity of the conveyor is to be. A bushing is machined from rigid metal to close tolerances for a workpiece holder, and a circlip made to special order to retain the bushing to the link. This conveyor results in extremely high internal friction due to large bearing surfaces, making the chain difficult to drive. The assembly of the chain is slow and tedious since the links are very easily damaged and care must be taken to avoid bending them. Assembly time might not appear to be a problem; however, picking up more than fifteen or twenty connected links and bushings of this type will result in damaged links. When a completed conveyor chain consists of 100 to 200 links, it is obvious that in-plant handling and assembly become a major problem. Also, the links require extensive tooling to be made in production quantities and, when made from stainless steel, the tool life is short. As can be seen from FIG. 1 of the patent, guides are required the full length of the conveyor, which is expensive, as are the types of metal parts required for withstanding the stress imposed by the duty cycle of the conveyor and the necessary handling. The tubular sections which carry the samples contained in bottles are free to revolve and do not maintain any particular rotational orientation.

Two other prior art conveyors of this type are disclosed in U.S. Patents 519,630, Hogg, and 3,187,182, Fratantuno. In both of these a chain like a bicycle chain is used with the interconnecting member between the links serving as the workpiece receptacle.

A second form of prior art conveyor is illustrated in FIG. 1 hereof and consists of individually machined tubular sections 10, interwoven in three Mylar bands 11, to form a chain of the desired length and number of samples. In such a device, extensive machining is required on the tubular sections 10 to provide relief for the Mylar bands 11, which are difficult to assemble around all the tubes and then bond the ends with the proper tension. High internal friction between the Mylar bands 11 and the tubular sections 10 make the chain difficult to drive. The links are not numbered, making it inconvenient to load samples in the chain to correspond to the sample number being displayed on the read-out of the associated instrument. Again, the tubular sections do not maintain any particular rotational orientation. Field repair of such a conveyor chain would be next to impossible.

Still another prior art approach is illustrated in FIG. 2 hereof, where the sample containing device consists of individually machined tubular sample holder sections 12, not connected in any way but placed in interconnecting ways 13 and driven by flat web belts 14, running alternately one direction and then the other. Since the tubular sections 12 are not in any way connected or retained, this makes the removal and misplacement of one or more of the parts almost a certainty. Again, the tubular sections 12 are not numbered, making it inconvenient to load samples into the machine to correspond to the sample number being displayed on the read-out of the associated instrument. It is virtually impossible to accurately index the tubular sections 12 station to station. The alternate direction, flat belt drive is complicated, expensive and unreliable due to stretch and slippage.

The ways 13, through which the tubular sections 12 holding the samples must pass, must be very accurately machined and deburred so they present no obstruction whatsoever to the sections 12 passing through. This is very important since the only driving force acting on the sample holder sections 12 is the friction of the flat belts 14 rubbing on the sample holder sections 12 themselves. The machining of the ways 13, in addition to the long straight sections, involves several 180° small radius turns that are difficult and expensive to make. The flat belt 14, rubbing on the sample holder sections 12, generates a charge of static electricity on the sample holder sections 12 that must be discharged before the sample is lowered into an associated detection chamber. This can be done in a number of ways but only at added expense. Again, the tubular sections 12 do not maintain any particular rotational orientation.

It is the main purpose of the invention to provide a new and improved sample conveying chain for a liquid scintillation spectrometer which may be driven with a relatively low torque and which maintains the rotational orientation of its links and an element carried thereby.

These and other objects are achieved by providing a conveyor chain for a liquid scintillation spectrometer characterized by tubular links forming workpiece holding receptacles, adjacent links positioned such that their circumferences substantially intersect along a vertical line, a vertical hole through adjacent links along said line, a pin inserted through said hole to interconnect said links, providing for positive rotational orientation of said links when said chain is in tension and keyways provided in the links for interacting with keys contained on an element to be carried thereby in a particular rotational orientation.

The novel features which are believed to be characteristic of the invention are set forth with particularity in the appended claims. The invention, and further objects and advantages thereof, can best be understood by reference to the following description and accompanying drawings in which:

Figure 1:
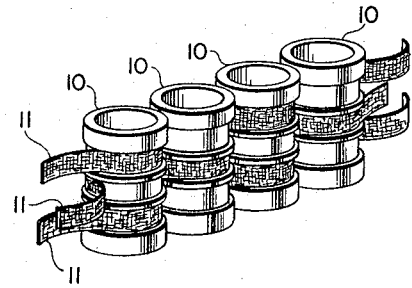
FIG. 1 illustrates a section of one form of prior art conveyor in isometric view.
Figure 2:
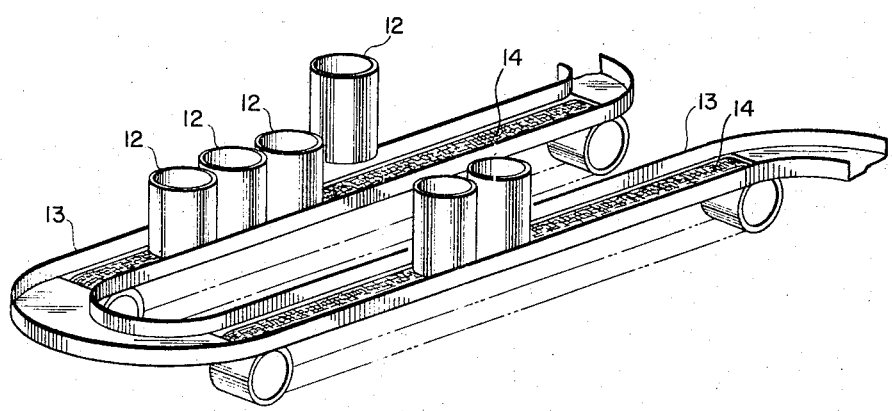
FIG. 2 illustrates a section of a second prior art form of conveyor in isometric view, partly exploded; and, FIG. 3 is an isometric view of a section of the conveyor chain of the subject invention, again partially exploded to illustrate assembly.
Figure 3:
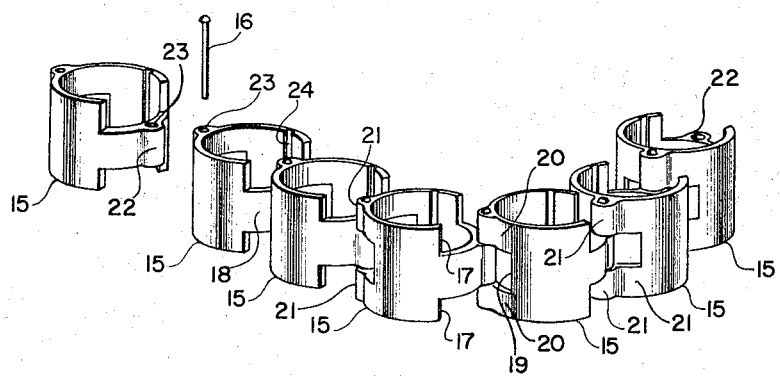

Turning now to the drawings, the prior art conveyors of FIGS. 1 and 2 have been described together with their disadvantages, and together with other prior art conveyors disclosed in issued U.S. patents in the above discussion of prior art. In order to overcome the problems mentioned and to provide improved features, the conveyor of FIG. 3 of the subject invention is designed to provide minimal internal friction and positive rotational orientation of the links 15, which make up the chain. The chain consists of two parts per sample, the links 15 and the interconnecting pin 16. Links 15 are connected together by pins 16 to form a chain of the desired length and number of samples. The links 15 may be injection-molded from a glass fibre filled acetal resin. The pins may be, for example, a one-inch long escutcheon pin (brass nail).

The method of orienting the chain links will be better appreciated upon a fuller examination of their structure and interconnection. The links 15 are illustrated as generally cylindrical in nature although they could be a tubular section having one or more straight sides or any other form. Since it is desired to interconnect them along a line at which their circumferences substantially intersect in order to maintain the desired rotational orientation, the leading side of links 15 can be seen to contain two cut-out portions 17 from their top and the bottom, leaving a leaf portion 18. This is referred to as the leading side of the link 15, as opposed to the trailing side which has a single cutout 19 which serves to cooperate with leaf 18 in the manner of a double leaf hinge. The trailing side cut-out 19 forms upper and lower leaves 20 for cooperating with the leaf 18. Along the line of contact between the links, extensions 21 are provided on the leaves 20 on the trailing edge and a cooperating extension 22 is provided on the leaf 18 for providing a vertically aligned hole 23 down through the leaves 18 and 20 and/or the extensions 21 and 22 for inserting the pin 16 in such a manner that succeeding links are positively attached along the line of their intersecting circumferences. It will be obvious that the leaves 18 and 20 are not required, but that interleaving extensions similar to extensions 21 and 22 alone could be employed.

The links 15 can also be seen to contain a keyway 24, which will serve to positively, rotationally orient a control tower of the type disclosed in a copending patent application entitled Control Tower and Method for Programming Automatic Radioactivity Measuring System, Ser. No. 541,674, R. E. Nather, filed concurrently herewith and assigned to the assignee of the present invention, to position it in front of the associated photocell assembly disclosed therein, in the proper manner by retaining its rotational orientation for optical programming of the electronics discussed therein.

The aforementioned Nather application also discloses the simplicity of the guide mechanism which may be employed with a chain such as disclosed herein, where the only guides necessary are at the points at which the chain changes its direction. Obviously, to do this it is necessary to maintain a certain amount of tension on the chain as it goes around the associated driving sprocket, idler wheels and guide rails. However, the amount of friction and required tension still permit driving the conveyor of the invention with the substantially lower torque desired. Due to the lower friction present in this chain, it may employ a driving mechanism having a much lower torque and a 100 sample chain can be driven by an inexpensive low torque gear motor. Such a conveyor drive is disclosed in a copending application entitled Conveyor Drive and Indexing Mechanism for Liquid Scintillation, R. Cannon, Ser. No. 541,595, filed concurrently herewith and assigned to the same assignee as the present invention. In one instance, a motor having a torque of 20-inch pounds was used, replacing a motor of 80-inch pounds which was required to drive a sample conveying chain containing the same number of samples, employing a chain such as disclosed in U.S. Patent 3,206,006.

Injection molding is generally accepted to be one of the key manufacturing methods in obtaining high volume, low cost parts. Manufacturing costs of the chain of the subject invention using injection molded links is conservatively one-tenth that of the prior art designs. Also, the links made from glass fibre filled acetal resin are rugged since this is a tough, spring-like material and impervious to most solvents and chemicals with excellent impact resistance. When the links are assembled, they can withstand considerable mishandling without incurring damage. The sample chain is easy to assemble, requiring no special tools or fixtures and can be installed and removed from the conveyor bed without disconnecting any of the links.

The individual links may be numbered for convenience which may be accomplished by hot stamping, a permanent marking process used exclusively on plastic at substantially lower cost than comparable markings on metal. As previously mentioned, the chain requires no guides to track properly other than the primary driving sprocket and idler wheels for directional change, illustrated in the above referenced Nather application. Obviously, other methods for manufacturing the links could be employed, such as die-casting them from aluminum or white metal which would, however, involve an additional cost.

Since the principles of the invention have now been made clear, modifications which are particularly adapted for specific situations without departing from those principles will be apparent to those skilled in the art. The appended claims are intended to cover such modifications as well as the subject matter described and to only be limited by the true spirit of the invention.

What is claimed is:

1. A conveyor chain for a liquid scintillation spectrometer comprising:
  tubular links forming workpiece holding receptacles, adjacent links positioned such that their circumferences substantially intersect along a vertical line;
  a vertical hole through adjacent links along said line;
  a pin inserted through said hole to interconnect said links, providing for positive rotational orientation of said links when said chain is in tension; and
  a keyway in said tubular links for cooperating with a key in a object to rotationally orient said object in said links.

2. The chain of claim 1 in which said tubular links each contain at least one interleaving portion on their leading and trailing edges, said portions interleaving along said line.

3. The chain of claim 2 in which said interleaving portions constitute extensions on said links along said line, said extensions interleaving between said links.

4. The chain of claim 2 in which said interleaving portions are formed by at least one interleaving cut-out and leaf in said links along said line.

5. The chain of claim 2 in which said interleaving portions are formed by interleaving cut-outs and leaves in said links along said line, said leaves having extensions thereon along said line, and said hole is in part in said extensions.

References Cited

UNITED STATES PATENTS

| | | | |
|---|---|---|---|
| 1,756,554 | 4/1930 | Hippenmeyer | 198—131 |
| 2,605,886 | 8/1952 | Gibson | 198—131 |

EDWARD A. SROKA, *Primary Examiner.*

EVON C. BLUNK, *Examiner.*

A. C. HODGSON, *Assistant Examiner.*